United States Patent [19]
Boroschewski

[11] 3,901,936
[45] Aug. 26, 1975

[54] PROCESS FOR THE PREPARATION OF N-CARBAMOYLOXYPHENYL CARBAMATES

[75] Inventor: Gerhard Boroschewski, Berlin, Germany

[73] Assignee: Schering Aktiengesellschaft, Bergkamen, Germany

[22] Filed: Mar. 12, 1973

[21] Appl. No.: 339,977

Related U.S. Application Data

[63] Continuation-in-part of Ser. No. 669,697, Sept. 22, 1967, abandoned.

[30] Foreign Application Priority Data

Oct. 15, 1966 Germany.......................... 3967812

[52] U.S. Cl.................. 260/471 C; 71/88; 71/111; 260/247.2 B; 260/347.5; 260/472

[51] Int. Cl.$^2$........................................ C07C 125/06
[58] Field of Search...................... 260/471 C, 472

[56] References Cited
OTHER PUBLICATIONS

Adams, P. et al., Chemical Reviews, Vol. 65 (1965) QD 1A 563, page 570.

*Primary Examiner*—Anton H. Sutto
*Assistant Examiner*—L. A. Thaxton
*Attorney, Agent, or Firm*—Joseph F. Padlon

[57] ABSTRACT

The specification discloses the production of herbicidal N-carbamoyloxyphenyl carbamic acid esters and a process for the production thereof in which an N-hydroxyphenyl carbamate is added to a reaction mixture comprising phosgene and an amine.

2 Claims, No Drawings

PROCESS FOR THE PREPARATION OF N-CARBAMOYLOXYPHENYL CARBAMATES

This is a continuation in part of my co-pending application, Ser. No. 669,697 filed 9/22/67 now abandoned.

The instant invention is directed to the production of N-carbamoyloxyphenyl carbamates by a single-step reaction in which an N-hydroxyphenyl carbamate is added directly to a reaction mixture comprising phosgene and an amine. The desired product is recovered directly from the resulting reaction mixture in good yields and substantially free of reaction by-products and impurities.

The compounds produced by the reaction herein described have the general formula and structure:

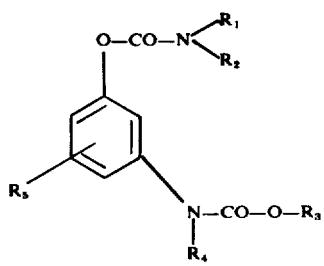

wherein $R_1$, $R_2$, and $R_3$ are individually selected from the group consisting of aliphatic radicals, cycloaliphatic radicals, arylaliphatic radicals, aromatic radicals, and heterocyclic radicals. Aliphatic radicals may be substituted by heterocyclic groups and the remaining groups may carry one or more halogen atoms, alkyl, haloalkyl, alkoxy, or alkylmercapto groups. In addition to the above, $R_1$ and $R_2$ can be hydrogen or when taken together with the amino-nitrogen can form a heterocycle which may contain oxygen atoms or additional nitrogen atoms. $R_4$ and $R_5$ are individually selected from the group consisting of hydrogen and aliphatic radicals.

In preferred embodiments of the invention $R_1$ and $R_2$ are hydrogen, lower alkyl, haloalkyl, alkaryl, or cycloalkyl. $R_3$ can be alkyl, preferably lower alkyl, aryl, preferably phenyl, alkaryl or alkenyl, preferably allyl. $R_4$ can be hydrogen, aliphatic or lower alkyl. $R_5$ can be hydrogen or lower alkyl. As used herein the term lower alkyl refers to straight or branched chain alkyl groups having from 1 to about 6 carbon atoms.

The above described compounds have been found useful in the control of weeds and undesirable plants and have hereto fore been prepared by reaction of carbamic acid chlorides or isocyanates and N-hydroxyphenyl urethanes. These procedures are disadvantageous however, because of the limited number of compounds which can be prepared. For example, when isocyanates are employed only compounds having a monosubstituted carbamoyl moiety can be prepared, i.e., either $R_1$ or $R_2$, above, must be hydrogen. Disubstituted compounds require an additional alkylation step which introduces a possibility of alkylation of the other nitrogen atom. Anhydrous reaction conditions are usually required in order to avoid decomposition of the isocyanate.

In the instant process the above described compounds can be conveniently prepared in a single reaction mixture and without recovery of intermediates by a process in which an N-hydroxyphenyl urethane of the formula

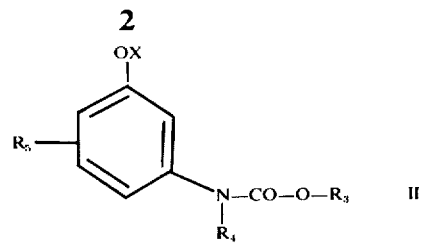

is added to a reaction mixture comprising phosgene and a selected amine having the formula

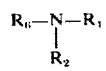

wherein $R_1$ through $R_5$ are defined above, $R_6$ is hydrogen or an aliphatic radical, preferably a lower alkyl group, and X is hydrogen, a monovalent metal, preferably an alkali metal or an ammonium group having one or more N-alkyl substituents.

Use of the above described process provides a means of preparing the desired products from known N-hydroxyphenyl urethanes and amines under convenient conditions and most importantly without the necessity of recovering and further reaction of intermediates. Another important advantage of the above described process is that the final product is obtained in high yields without substantial by-product production or the presence of substantial amounts of impurities resulting from the chemical reaction itself.

The process of the instant invention employs N-hydroxyphenyl urethanes which may be derived from primary or secondary alcohols or from phenols. Aliphatic alcohols, cycloaliphatic and arylaliphatic are useful and can generally carry various substituents such as halogen atoms, alkyl radicals, haloalkyl radicals, and alkoxy, or alkylmercapto groups. Among the most preferred compounds are lower alkyl, such as methyl, ethyl, propyl, and isopropyl; m-butyl, sec. butyl, and tert. butyl. Also suitable are beta-chloroethyl, allyl and butyne-1-yl-3-urethanes.

In place of the n-hydroxyphenyl urethane, per se, there can be used salts formed by reaction of the urethane with alkali hydroxides, aqueous ammonia, or amines which may be primary, secondary, or tertiary and alkyl or aromatic.

Illustrative amines include aniline, N-methylaniline, 2-, 3- and 4-chloroaniline, 4-fluoroaniline, 4-bromoaniline, 4-iodoaniline, 2-, 3- and 4-toluidine, 2,3-dimethyl aniline, 2,4-dimethyl aniline, 3-trifluoromethyl aniline, N-ethyl-4-toluidine, methylamine, ethylamine, propylamine, isopropylamine, butylamine, isobutylamine, sec.-butylamine, tert.-butylamine, hexylamine, octylamine, trimethylamine, triethylamine, 1-methyl-1-ethyl-amylamine, 2,2-dimethylpropylamine, N,N-dimethylaniline and N,N-diethylaniline and others.

The above-described process is carried out in solution in which the solvent is an organic solvent e.g., chlorinated hydrocarbons, esters, nitriles and ethers. Specific examples of suitable solvents are acetic ester, acetonitrile and dioxane.

The reaction can be carried out at temperatures ranging from 0°C. to about 100°C. and preferably from room temperature to about 100°C. Once the reaction has been completed, the reaction mixture is worked up using standard procedures for separation of solvent phases and precipitation or crystallization of reaction products. Generally, salts which form can be separated by filtration or addition of suitable amounts of water which is later separated from the organic phase. The organic phase is recovered and dried and finally evaporated under reduced pressure. The use of ice water to facilitate crystallization from the organic phase is often advantageous. It is also advantageous to carry out the reaction in the presence of an acid acceptor agent such as one of the above-described amines or an alkali carbonate e.g., sodium carbonate, or triethylamine.

The reaction products are generally colorless crystalline materials, as described below, which have good herbicidal properties.

The following examples illustrate the practice of the instant invention.

The N-hydroxyphenylurethanes useful as starting materials can be prepared by the procedure shown in Example I, following.

EXAMPLE 1

21.8 g (0.2 mole) m-aminophenol and 5 g magnesium oxide are dispersed in 70 ml. water and 70 ml. ethyl acetate. The mixture is cooled to 10°– 15°C. whereupon 26.5 g (0.2 mole) butin-(1)-yl-(3)-chloroformate is added drop by drop and stirring is continued for 30 minutes at room temperature. Thereafter the excess of magnesium oxide is dissolved in dilute hydrochloric acid, and the organic phase is washed with a little water and thereafter with dilute potassium bicarbonate solution until neutral. After drying over desiccated sodium sulfate and evaporation of the ethyl acetate in a vacuum, the crude product is purified by dissolving it in a little ether, filtering the ether solution, and crystallizing the butin-(1)-yl-(3)-N-(3-hydroxyphenyl)-carbamate by addition of petroleum ether.

Table I, following shows additional compounds, having structure II, which have been prepared by the procedure of Example 1.

Table I

| X | $R_3$ | $R_4$ | $R_5$ | M.P. |
|---|---|---|---|---|
| H | Ethyl | H | H | 93 – 95°C. |
| H | β-Choroethyl | H | H | 75 – 76°C. |
| H | Methyl | H | H | 94 – 95°C. |
| H | n-Propyl | H | H | 71 – 73°C. |
| H | n-Butyl | H | H | 87 – 88°C. |
| H | sec.-Butyl | H | H | 115.5 – 116.5°C. |
| H | Isopropyl | H | H | 76°C. |
| H | Allyl | H | H | 53 – 54°C. |
| H | Phenyl | H | H | 181 – 183°C. |
| H | 3-Methylphenyl | H | H | 119 – 120°C. |
| H | Methyl | H | 6-Methyl | 116 – 117°C. |
| H | Methyl | H | 4-Methyl | 125 – 126°C. |

Salts of these derivatives wherein X has the meaning of monovalent metal e.g., sodium or potassium, are obtained by adding a calculated amount of metal hydroxide or metal methylate to a solution of the derivative for example in methanol), and subsequent evaporation in a vacuum. The salts with ammonia, N-alkylamines, N,N-dialkylamines, and N,N,N-trialkylamines need not be recovered for the subsequent reaction. It is preferred to employ solutions which contain molar amounts of the hydroxyphenylurethanes and of the amine.

EXAMPLE 2

Production of
methyl-N-(3-(N'-(3'-methylphenyl)-carbamoyloxy)-phenyl)carbamate 20.3 g (0.205 mole) of phosgene are dissolved in 40 ml. of dioxane. To this solution is added in drops while cooling at about 20° to 25°C., a solution of 21.4 g (0.2 mole) of m-toluidine, 42.5 g (0.42 mole) of triethylamine and 33.4 g (0.20 mole) of methyl-N-(3-hydroxyphenyl) carbamate in 100 ml. of dioxane while stirring. The mixture is heated to 70°C. for 30 minutes. After cooling, it is poured into iced water. The separated oil crystallizes upon trituration with pure water and is purified by washing with a little ether.

Yield: 52.6 g = 87.7% of the theory
F = 139° to 142°C.

EXAMPLE 3

Production of
ethyl-N-(3-(N'-methyl-N'-phenylcarbamoyloxy)-phenyl)carbamate

In a solution of 9.89 g (0.1 mole) of phosgene in 50 ml. of dioxane, there is added in drops while stirring at 20° to 25°C., a solution of 18.1 g (0.1 mole) of ethyl-N-(3-hydroxyphenyl) carbamate and 24.2 g (0.2 mole) of N,N-dimethyl aniline in 50 ml. of dioxane. The mixture is then boiled for 90 minutes with reflux, and poured into iced water after cooling, the resultant carbamate is extracted with ether, and the ether solution washed with dilute soda lye and iced water and dried with magnesium sulfate. After evaporation of the ther, the carbamate crystallizes upon addition of light gasoline.

Yield: 26.7 g = 85% of the theory
F = 103° to 104°C.

The following compounds have been prepared by the procedures disclosed herein.

It will be noted that the symbol F in the table below represents the melting point (MP).

| Compound No. | Name of Compound | Physical Constant |
|---|---|---|
| 1 | Ethyl-N-(3-(N'-(2'-chlorophenyl-carbamoyloxy)-phenyl)carbamate | F=117–119°C |
| 2 | beta-chloroethyl-N-(3-(N'-(2'-chlorophenyl)-carbamoyloxy)-phenylcarbamate | F=116–117°C |
| 3 | Methyl-N-(3-(N'-(3'-chlorophenyl)-carbamoyloxy)-phenyl)carbamate | F=153–155°C |
| 4 | Ethyl-N-(3-(N'-(3'-chlorophenyl)-carbamoyloxy)-phenyl)carbamate | F=127–128°C |
| 5 | Methyl-N-(3-(N'-(4'-chlorophenyl)-carbamoyloxy)-phenyl)carbamate | F=178°C |
| 6 | Ethyl-N-(3-(N'-(4'-chlorophenyl)-carbamoyloxy)-phenyl)carbamate | F=150–151°C |
| 7 | n-propyl-N-(3-(N'-(4'-chlorophenyl)-carbamoyloxy)-phenyl)carbamate | F=147°C |
| 8 | n-butyl-N-(3-(N'-(4'-chlorophenyl)-carbamoyloxy)-phenyl)carbamate | F=138°C |
| 9 | Methyl-N-(3-(N'-(2'-methylphenyl)-carbamoyloxy)-phenyl)carbamate | F=158–160°C |
| 10 | Ethyl-N-(3-N'-(2'-methylphenyl)-carbamoyloxy)-phenyl)carbamate | F=126–127°C |

-Continued

| Compound No. | Name of Compound | Physical Constant |
|---|---|---|
| 11 | beta-chloroethyl-N-(3-(N'-(2'-methylphenyl)-carbamoyloxy)-phenyl)carbamate | F=129–130°C |
| 12 | Butyne-(1)-yl-(3)-N-(3'-(N'-(3''-methyl-phenyl)-carbamoyloxy)-phenyl)carbamate | F=140–141°C |
| 13 | Butyne-(1)-yl(3)-N-(3'-(N'-(4''-methylphenyl)-carbamoyloxy)-phenyl)carbamate | F=153–155°C |
| 14 | Butyne-(1)-yl(3)-N-(3'-(N'-(3''-trifluoromethylphenyl)-carbamoyloxy)-phenyl)carbamate | F=129–130°C |
| 15 | Ethyl-N-(3-(N',N'-diethylcarbamoyloxy)-phenyl)carbamate | F=75–76°C |
| 16 | Ethyl-N-(3-(N',N'-pentamethylene carbamoyloxy)-phenyl)carbamate | F=103.5–105.5°C |
| 17 | Ethyl-N-(3'-(N'-methylcarbamoyloxy)-phenyl)carbamate | F=131–132°C |
| 18 | beta-chloroethyl-N-(3-(N'-methylcarbamoyloxy)-phenyl)carbamate | F=127–128°C |
| 19 | n-propyl-N-(3-(N'-methylcarbamoyloxy)-phenyl)carbamate | F=125–127°C |
| 20 | n-butyl-N-(3-(N'-methylcarbamoyloxy)-phenyl)carbamate | F=111–112°C |
| 21 | Methyl-N-(3-(N'-n-butylcarbamoyloxy)-phenyl)carbamate | F=114–115°C |
| 22 | Ethyl-N-(3-N'-n-butylcarbamoyloxy)-phenyl)carbamate | F=99.5°C |
| 23 | Sec.-Butyl-N-(3-(N'-n-butylcarbamoyloxy)-phenyl)carbamate | F=142–143°C |
| 24 | Methyl-N-(3-(N'-cyclohexylcarbamoyloxy)-phenyl)carbamate | F=159–161°C |
| 25 | Ethyl-N-(3-(N'-cyclohexylcarbamoyloxy)-phenyl)carbamate | F=128°C |
| 26 | beta-chloroethyl-N-(3-(N'-cyclohexylcarbamoyloxy)-phenyl)carbamate | F=147–148°C |
| 27 | n-propyl-N-(3-(N'-cyclohexylcarbamoyloxy)-phenyl)carbamate | F=160°C |
| 28 | n-butyl-N-(3-(N'-cyclohexylcarbamoyloxy)-phenyl)carbamate | F=140–141°C |
| 29 | Ethyl-N-(3-(N'-(3'-methylphenyl)-carbamoyloxy)-phenyl)carbamate | F=109–110°C |
| 30 | beta-chloroethyl-N-(3-(N'-(3'-methylphenyl)-carbamoyloxy)-phenyl)carbamate | F=118–119°C |
| 31 | Methyl-N-(3-(N'-(4'-methylphenyl)-carbamoyloxy)-phenyl)carbamate | F=162–163.5°C |
| 32 | Ethyl-N-(3-(N'-(4'-methylphenyl)-cabamoyloxy)-phenyl)carbamate | F=147–148°C |
| 33 | Ethyl-N-(-(3'-trifluoromethyl)-phenyl)-carbamoyloxy)-phenyl)carbamate | F=130–131°C |
| 34 | beta-chloroethyl-N-(3-(N'-(3'-trifluoromethylphenyl)-carbamoyloxy)-phenyl)carbamate | F=132–133°C |
| 35 | Butyne-(1)-yl-(3'-(N'-methylcarbamoyloxy)-phenyl)carbamate | F=157–159°C |
| 36 | Butyne-(1)-yl-(3)-N-(3'-(N'-cyclohexyl)-carbamoyloxy)-phenyl)-carbamate | F=146–147°C |
| 37 | Butyne-(1)-yl-(3)-N-(3'-(N'-phenylcarbamoyloxy)-phenyl)carbamate | F=164–166°C |
| 38 | Butyne-(1)-yl-(3)-N-(3'-(N'-(2''-chlorophenyl)-carbamoyloxy)-phenyl)carbamate | F=134–136°C |
| 39 | Butyne-(1)-yl-(3)-N-(3'-(N'-(4''-chlorophenyl)-carbamoyloxy)-phenyl)carbamate | F=153–155°C |
| 40 | Butyne-(1)-yl-(3)-N-(3'-(N'-(2''-methyl-phenyl)-carbamoyloxy)-phenyl)carbamate | F=155–156°C |
| 41 | Sec.-Butyl-N-(3-(N'-cyclohexylcarbamoyloxy)-phenyl)carbamate | F=149–150°C |
| 42 | Methyl-N-(3-(N'-phenylcarbamoyloxy)-phenyl)carbamate | F=152°C |
| 43 | Ethyl-N-(3-(N'-phenylcarbamoyloxy)-phenyl)carbamate | F=118–119°C |
| 44 | beta-chloroethyl-N-(3-(N'-phenylcarbamoyloxy)-phenyl)carbamate | F=149–150°C |
| 45 | n-propyl-N-(3-(N'-phenylcarbamoyloxy)-phenyl)carbamate | F=125–126°C |
| 46 | Isopropyl-N-(3-(N'-phenylcarbamoyloxy)-phenyl)carbamate | F=133–135°C |
| 47 | n-butyl-N-(3-(N'-phenylcarbamoyloxy)carbamate | F=145°C |
| 48 | Sec.-butyl-N-(3-(N'-phenylcarbamoyloxy)-phenyl)carbamate | F=145–147°C |
| 49 | Methyl-N-(3-(N'-(2-chlorophenyl)-carbamoyloxy)-phenyl)carbamate | F=124–126°C |
| 50 | Morpholine-N-carboxylic acid-3-carbethyoxy-aminophenylester | F=114–115°C |
| 51 | Ethyl-N-(3-(N'-(alpha-naphthylcarbamoyloxy)-phenyl)carbamate | F=150–151°C |
| 52 | Methyl-N-(3-(N'-(alpha-naphthyl)-carbamoyloxy)-phenyl)carbamate | F=166–168°C |
| 53 | Ethyl-N-(3-(N'-(3',4'-dichlorophenyl)-carbamoyloxy)-phenyl)carbamate | F=154–155°C |
| 54 | Methyl-N-(3-(N'-methylcarbamoyloxy)-phenyl)carbamate | F=126–127°C |
| 55 | Methyl-N-(3-(N'-(3',4'-dichlorophenyl)-carbamoyloxy)-phenyl)carbamate | F=188–190°C |
| 56 | Methyl-N-(3-(N'-(3'-chloro-4'-methylphenyl)-carbamoyloxy)-phenyl)carbamate | F=167–168°C |
| 57 | Ethyl-N-(3-(N'-(3'-chloro-4'-methylphenyl)-carbamoyloxy)-phenyl)carbamate | F=150–151°C |
| 58 | n-propyl-N-(3-(N'-ethylcarbamoyloxy)-phenyl)carbamate | F=120°C |
| 59 | n-propyl-N-(3-(N'-n-propylcarbamoyloxy)-phenyl)carbamate | F=122°C |
| 60 | n-propyl-N-(3-(N'-isopropylcarbamoyloxy)-phenyl)carbamate | F=154°C |
| 61 | n-propyl-N-(3-(N'-n-butylcarbamoyloxy)-phenyl)carbamate | F=117°C |
| 62 | n-butyl-N-(3-(N'-ethylcarbamoyloxy)-phenyl)carbamate | F=112°C |
| 63 | n-butyl-N-(3-(N'-isopropylcarbamoyloxy)-phenyl)carbamate | F=129°C |
| 64 | n-butyl-N-(3-(N'-butylcarbamoyloxy)-phenyl)carbamate | F=108°C |
| 65 | Isopropyl-N-(3-(N'-ethylcarbamoyloxy)-phenyl)carbamate | F=145.5–147°C |
| 66 | Isopropyl-N-(3-(N'-isopropylcarbamoyloxy)-phenyl)carbamate | F=155.5–158°C |

-Continued

| Compound No. | Name of Compound | Physical Constant |
|---|---|---|
| 67 | Isopropyl-N-(3-(N'-n-propylcarbamyloxy)-phenyl)carbamate | F=142–144°C |
| 68 | Isopropyl-N-(3-(N'-n-butylcarbamoyloxy)-phenyl)carbamate | F=143–144°C |
| 69 | Isopropyl-N-(3-(N'-cyclohexylcarbamoyloxy)-phenyl)carbamate | F=157.5–158.5°C |
| 70 | Methyl-N-(3-(N'-ethylcarbamoyloxy)-phenyl)carbamate | F=148–151°C |
| 71 | Methyl-N-(3-(N'-isopropylcarbamoyloxy)-phenyl)carbamate | F=156–159.5°C |
| 72 | Methyl-N-(3-(N'-n-propylcarbamoyloxy)-phenyl)carbamate | F=142–144°C |
| 73 | Ethyl-N-(3-(N'-ethylcarbamoyloxy)-phenyl)carbamate | F=146.5–149°C |
| 74 | Ethyl-N-(3-(N'-isopropylcarbamoyloxy)-phenyl)carbamate | F=163–166°C |
| 75 | Ethyl-N-(3-(N'-n-propylcarbamoyloxy)-phenyl)carbamate | F=134–137°C |
| 76 | n-propyl-N-(3-(N'-tert.-butylcarbamoyloxy)-phenyl)carbamate | F=164–165°C |
| 77 | Ethyl-N-(3-(N'-tert.-butylcarbamoyloxy)-phenyl)carbamate | F=159–160°C |
| 78 | Methyl-N-(3-(N'-tert.-butylcarbamoyloxy)-phenyl)carbamate | F=165–166°C |
| 79 | Isopropyl-N-(3-(N'-methylcarbamoyloxy)-phenyl)-carbamate | F=155.5–157°C |
| 80 | Ethyl-N-(3-(N'-sec.-butylcarbamoyloxy)-phenyl)carbamate | F=173–174°C |
| 81 | Ethyl-N-(3-(N'-isobutylcarbamoyloxy)-phenyl)carbamate | F=145–146°C |
| 82 | Methyl-N-(3-(N'-allylcarbamoyloxy)-phenyl)carbamate | F=132–134°C |
| 83 | Ethyl-N-(3-(N'-allylcarbamoyloxy)-phenyl)carbamate | F=123–124°C |
| 84 | Methyl-N-(3-(N'-sec.-butylcarbamoyloxy)-phenyl)carbamate | F=137–138°C |
| 85 | Methyl-N-(3-(N'-isobutylcarbamoyloxy)-phenyl)carbamate | F=117–118°C |
| 86 | Methyl-N-(3-(N'-n-hexylcarbamoyloxy)-phenyl)carbamate | F=112–113°C |
| 87 | Ethyl-N-(3-(N'-n-hexylcarbamoyloxy)-phenyl)carbamate | F=90–91°C |
| 88 | Ethyl-N-(3-(N'-2'-,3'-dimethylphenyl)-carbamoyloxy)-phenyl)carbamate | F=141–142°C |
| 89 | Ethyl-N-(3-(N'-(2',4'-dimethylphenyl)-carbamoyloxy)-phenyl)carbamate | F=158–159°C |
| 90 | Methyl-N-(3-(N'-(2',3'-dimethylphenyl)-carbamoyloxy)-phenyl)carbamate | F=154–155°C |
| 91 | Methyl-N-(3-(N'-(2',4'-dimethylphenyl)-carbamoyloxy)-phenyl)carbamate | F=150–151°C |
| 92 | Methyl-N-(3-(N'-n-octylcarbamoyloxy)-phenyl)carbamate | F=117–118°C |
| 93 | Ethyl-N-(3-(N'-n-octylcarbamoyloxy)-phenyl)carbamate | F=90–91°C |
| 94 | Methyl-N-(3-(N'-(4'-fluorophenyl)-carbamoyloxy)-phenyl)carbamate | F=161–162°C |
| 95 | Methyl-N-(3-(N'-(4'-iodo-phenyl)-carbamoyloxy)-phenyl)carbamate | F=174.5–176°C |
| 96 | Methyl-N-(3-(N'-(4'-bromophenyl)-carbamoyloxy)-phenyl)carbamate | F=176–177.5°C |
| 97 | Ethyl-N-(3-(N'-(4'-fluoro-phenyl)-carbamoyloxy)-phenyl)carbamate | F=133–134°C |
| 98 | Ethyl-N-(3-(N'-iodo-phenyl)-carbamoyloxy)-phenyl-carbamate | F=163.5–164.5°C |
| 99 | Ethyl-N-(3-(N'-(4'-bromo-phenyl)-carbamoyloxy)-phenyl)carbamate | F=148–149°C |
| 100 | Methyl-N-(3-(N'-(1'-methyl-butyl)-carbamoyloxy)-phenyl)carbamate | F=149–149.5°c |
| 101 | Ethyl-N-(3-(N'-(1'-methyl-butyl)-carbamoyloxy)-phenyl)carbamate | F=157–159°C |
| 102 | Methyl-N-(3-(N'-(1'-dimethyl-butyl)-carbamoyloxy)-phenyl)carbamate | F=124–126°C |
| 103 | Ethyl-N-(3-(N'-(1',1'-dimethyl-butyl)-carbamoyloxy)-phenyl)carbamate | F=121–125°C |
| 104 | Allyl-N-(3-(N'-(3'-methylphenyl)-carbamoyloxy)-phenyl)carbamate | F=119–120°C |
| 105 | Allyl-N-(3-(N'-ethylcarbamoyloxy)-phenyl)carbamate | F=118°C |
| 106 | Allyl-N-(3-(N'-allylcarbamoyloxy)-phenyl)carbamate | F=105°C |
| 107 | Allyl-N-(3-(N'-isopropylcarbamoyloxy)-phenyl)carbamate | F=143°C |
| 108 | Allyl-N-(3-(N'-n-butylcarbamoyloxy)-phenyl)carbamate | F=99–100°C |
| 109 | Allyl-N-(3-(N'-methylcarbamoyloxy)-phenyl)carbamate | F=122–124°C |
| 110 | Allyl-N-(3-(N'-phenylcarbamoyloxy)-phenyl)carbamate | F=117°C |
| 111 | Allyl-N-(3-(N'-tert.-butylcarbamoyloxy)-phenyl)carbamate | F=149–150°C |
| 112 | Allyl-N-(3-(N'-cyclohexylcarbamoyloxy)-phenyl)carbamate | F=134–135°C |
| 113 | Allyl-N-(3-(N',N'-dimethylcarbamoyloxy)-phenyl)carbamate | F=87–88°C |
| 114 | Ethyl-N-(3-(N'-(1'-methyl-1'-ethylamyl)-carbamoyloxy)-phenyl)carbamate | F=102–103.5°C |
| 115 | Methyl-N-(3-(N'-methyl-N'-phenyl)-carbamoyloxy)-phenyl)carbamate | F=124°C |
| 116 | Methyl-N-(3-(N'-(1'-methyl-1'-ethylamylcarbamoyloxy)-phenyl)carbamate | F=105–106.5°C |
| 117 | Methyl-N-(3-(N'-(2',2'-dimethyl)-propyl)-carbamoyloxy)-phenyl)carbamate | F=113–114°C |
| 118 | Ethyl-N-(3-(N'-(2',2'-dimethyl)-propyl)-carbamoyloxy)-phenyl)carbamate | F=149–150°C |
| 119 | Methyl-N-(3-(N'-ethyl-N'-(4'-methylphenyl)-carbamoyloxy)-phenyl)carbamate | F=99–103°C |
| 120 | Ethyl-N-(3-(N'-ethyl-N'-(4'-methylphenyl)-carbamoyloxy)-phenyl)carbamate | F=87–88°C |
| 121 | Isopropyl-N-(3-(N'-methyl-N'-phenyl)-carbamoyloxy)-phenyl)carbamate | F=87–89°C |
| 122 | Methyl-N-(3-(N'-furfuryl-carbamoyloxy)-phenyl)carbamate | F=130–131°C |
| 123 | Phenyl-N-(3-(N'-methylcarbamoyloxy)-phenyl)carbamate | F=159–161°C |

| Compound No. | Name of Compound | Physical Constant |
|---|---|---|
| 124 | Phenyl-N-(3-(N'-ethylcarbamoyloxy)-phenyl)carbamate | F=146–147°C |
| 125 | 3-Methylphenyl-N-(3'-(N'-methylcarbamoyloxy)-phenyl)carbamate | F=157–158°C |
| 126 | 3-Methylphenyl-N-(3'-(N'-n-butylcarbamoyloxy)-phenyl)carbamate | F=139–140°C |
| 127 | 3-Methylphenyl-N-(3'-n-propylcarbamoyloxy)-phenyl)carbamate | F=144–145°C |
| 128 | Phenyl-N-(3-(N'-isopropylcarbamoyloxy)-phenyl)carbamate | F=147–148°C |
| 129 | Phenyl-N-(3-(N'-cyclohexylcarbamoyloxy)-phenyl)carbamate | F=187–188°C |
| 130 | 3-Methylphenyl-N-(3'-(N'-ethylcarbamoyloxy)-phenyl)carbamate | F=147–148°C |
| 131 | 3-Methylphenyl-N-(3'-(N'-isopropyl-carbamoyloxy)-phenyl)carbamate | F=136–138°C |
| 132 | 3-Methylphenyl-N-(3'-(N'-cyclohexyl-carbamoyloxy)-phenyl)carbamate | F=186–187°C |
| 133 | Phenyl-N-(3-(N'-n-butylcarbamoyloxy)-phenyl)carbamate | F=145–147°C |
| 134 | Phenyl-N-(3-N'-n-propylcarbamoyloxy)-phenyl)carbamate | F=146–147°C |
| 135 | Methyl-N-(3-(N'-methyl-N'-(4'-methylphenyl)carbamoyloxy)-phenyl)carbamate | |
| 136 | Ethyl-N-(3-(N'-methyl-N'-(4'-methylphenyl)-carbamoyloxy)-phenyl)carbamate | |
| 137 | Isopropyl-N-(3-(N'-methyl-N'-(4'-methylphenyl)-carbamoyloxy)-phenyl)carbamate | |
| 138 | Methyl-N-(3-(N'-methylcarbamoyloxy)-6-methyl-phenyl)carbamate | F=167–168°C |
| 139 | Methyl-N-(3-(N'-phenyl-carbamoyloxy)-4-methyl-phenyl)carbamate | F=186–188°C |
| 140 | Methyl-N-(3-(N'-cyclohexyl-carbamoyloxy)-4-methyl-phenyl)carbamate | F=163–165.5°C |
| 141 | Isopropyl-N-(3-(N'-methyl-N'-phenylcarbamoyloxy)-phenyl)carbamate | F=87–89°C |
| 142 | Methyl-N-(3-(N'-tert.-butylcarbamoyloxy)-4-methyl-phenyl)carbamate | F=164–164.5°C |
| 143 | Ethyl-N(3-(N'-ethyl-N'-(3'-methylphenyl)-carbamoyloxy)-phenyl)carbamate | F=79–80°C |
| 144 | Ethyl-N-(3-(N'-ethyl-N'-(2'-methylphenyl)-carbamoyloxy)-phenyl)carbamate | F=117–118°C |
| 145 | Isopropyl-N-(3-(N'-ethyl-N'-(3'-methylphenyl)-carbamoyloxy)-phenyl)carbamate | F=119–120°C |
| 146 | Isopropyl-N-(3-(N'-ethyl-N'-(2'-methylphenyl)-carbamoyloxy)-phenyl)carbamate | F=117–118°C |
| 147 | Methyl-N-(3-(N'-ethyl-N'-(2'-methylphenyl)-carbamoyloxy)-phenyl)carbamate | F=114–115°C |
| 148 | Methyl-N-(3-(N-methyl-N-(3-methylphenyl)-carbamoyloxy)-phenyl)carbamate | F 97–99 C |
| 149 | Allyl-N-(3-(N₂-octyl-carbamoyloxy)-phenyl)carbamate | F₆94–95₁C |
| 150 | Allyl-N-(3-(N₂-(4,-chlorophenyl)-carbamoyloxy)-phenyl)carbamate | F₆136–137₁C |
| 151 | Allyl-N-(3-(N₂-(4,-fluorophenyl)-carbamoyloxy)-phenyl)carbamate | F₆127–128₁C |
| 152 | Allyl-N-(3-(N₂-(4,-bromophenyl)-carbamoyloxy)-phenyl)carbamate | f₆140–142₁C |
| 153 | Allyl-N-(3-(N₂-(1,-methylbutyl)-carbamoyloxy)-phenyl)carbamate | F₆135–137₁C |
| 154 | Allyl-N-(3-(N₂-n-propyl)-carbamoyloxy)-phenyl)carbamate | F₆116–117₁C |
| 155 | Allyl-N-(3-(N₂-n-hexyl)-carbamoyloxy)-phenyl)carbamate | F₆98–99₁C |
| 156 | Allyl-N-(3-(N₂-(3,-chlorophenyl)-carbamoyloxy)-phenyl)carbamate | F₆123–124₁C |
| 157 | Allyl-N-(3-(N₂-(2,-methylphenyl)-carbamoyloxy)-phenyl)carbamate | F₆100–101₁C |
| 158 | Allyl-N-(3-(N₂-ethyl-N₂-(2,-methylphenyl)-carbamoyloxy)-phenyl)carbamate | F₆110–111₁C |
| 159 | Allyl-N-(3-(N₂-methyl-N₂-3,-methylphenyl)-carbamoyloxy)-phenyl)carbamate | F₆78–79₁C |
| 160 | Allyl-N-(3-(N₂-methyl-N₂-phenylcarbamoyloxy)-phenyl)carbamate | F₆88–89₁C |
| 161 | Ethyl-N-(3-(N₂-methyl-N₂-(3,-methylphenyl)-carbamoyloxy)-phenyl)carbamate | F₆86–88₁C |
| 162 | Isopropyl-N-(N₂-methyl-N₂-(3,-methylphenyl)-carbamoyloxy)-phenyl)carbamate | F₆81–82₁C |
| 163 | Allyl-N-(3-(N₂-methyl-N₂-(2-methylphenyl)-carbamoyloxy)-phenyl)carbamate | F₆104–105₁C |
| 164 | Allyl-N-(3-(N₂-ethyl-N₂-(3-methylphenyl)-carbamoyloxy)-phenyl)carbamate | F₆112–113₁C |
| 165 | Methyl-N-(3-carbamoyloxy)-phenyl)-carbamate | F₆185–187₁C |

What is claimed is:

1. A process for preparing N-carbamoyloxyphenyl carbamates of the formula

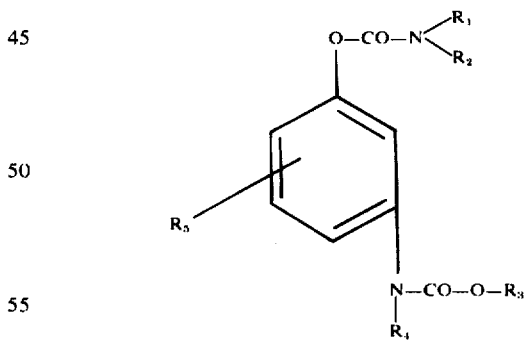

wherein $R_1$ and $R_2$ can be hydrogen, lower alkyl, lower haloalkyl, aromatic, or alkaryl; $R_3$ can be lower alkyl, phenyl, or allyl; $R_4$ and $R_5$ can be hydrogen or lower alkyl; and $R_6$ can be hydrogen or lower alkyl which comprises direct reaction without recovery of intermediates, of phosgene, an N-hydroxyphenyl urethane of the structure 11
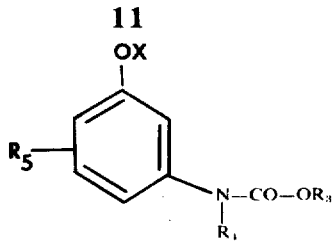
wherein X can be hydrogen or an alkali metal and $R_3$, $R_4$, and $R_5$ are as defined above with an amine of the formula
12
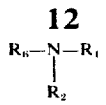
wherein $R_1$, $R_2$, and $R_6$ are as defined above; in an organic solvent at a temperature between 0° C and about 100° C.
2. The process of claim 1 wherein the organic solvent is selected from the group consisting of dioxane, acetic ester and acetonitrile.
* * * * *